US007203775B2

(12) United States Patent
Van Doren et al.

(10) Patent No.: US 7,203,775 B2
(45) Date of Patent: Apr. 10, 2007

(54) SYSTEM AND METHOD FOR AVOIDING DEADLOCK

(75) Inventors: Stephen R. Van Doren, Northborough, MA (US); Gregory E. Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 458 days.

(21) Appl. No.: 10/337,833

(22) Filed: Jan. 7, 2003

(65) Prior Publication Data

US 2004/0133744 A1    Jul. 8, 2004

(51) Int. Cl.
*G06F 3/00* (2006.01)

(52) U.S. Cl. .......................... 710/52; 710/57
(58) Field of Classification Search .................. 710/29, 710/52–57, 100, 107, 112, 305, 306, 310; 711/117, 118–122, 125, 129, 130, 132, 147–149, 711/152, 153, 173; 712/11, 28, 29; 709/213–214; 718/102–107

See application file for complete search history.

(56) References Cited

U.S. PATENT DOCUMENTS

| | | | | |
|---|---|---|---|---|
| 5,237,661 A | * | 8/1993 | Kawamura et al. | 710/52 |
| 5,652,885 A | * | 7/1997 | Reed et al. | 713/1 |
| 6,185,438 B1 | * | 2/2001 | Fox | 455/560 |
| 6,279,046 B1 | * | 8/2001 | Armstrong et al. | 710/5 |
| 6,317,427 B1 | * | 11/2001 | Augusta et al. | 370/357 |
| 6,601,083 B1 | * | 7/2003 | Reznak | 718/104 |
| 2002/0099918 A1 | * | 7/2002 | Avner et al. | 711/170 |
| 2004/0015686 A1 | * | 1/2004 | Conner et al. | 713/150 |
| 2004/0036159 A1 | * | 2/2004 | Bruno | 257/703 |

OTHER PUBLICATIONS

William Stallings, Operating Systems Internals and Design Principles, 2001, fourth edition, pp. 282-283.*
Patterson & Hennessy, Computer Organization & Design, 2nd edition, pp. 540-549.*
Microsoft Computer Dictionary 5th edition, 2002, Microsoft Press, p. 458.*
Ozveren, Cuneyt et al. ACM SIGCOMM, London, England, "Reliable and Efficient Hop-by-Hop Flow Control," 1994, pp. 1-12.
Dally, William J. IEEE "Virtual-Channel Flow Control," Artificial Intelligence Laboratory and Laboratory for Computer Science, Massachusetts Institute of Technology, 1990 pp. 60-68.

(Continued)

*Primary Examiner*—Fritz Fleming
*Assistant Examiner*—David Martinez

(57) ABSTRACT

A system and method avoids deadlock, such as circular routing deadlock, in a computer system by providing a virtual buffer at main memory. The computer system has an interconnection network that couples a plurality of processors having access to main memory. The interconnection network includes one or more routing agents each having at least one buffer for storing packets that are to be forwarded. When the routing agent's buffer becomes full, thereby preventing it from accepting any additional packets, the routing agent transfers at least one packet into the virtual buffer. By transferring a packet out of the buffer, the routing agent frees up space allowing it to accept a new packet. If the newly accepted packet also results in the buffer becoming full, another packet is transferred into the virtual buffer. This process is repeated until the deadlock condition is resolved. Packets are then retrieved from the virtual buffer.

22 Claims, 6 Drawing Sheets

OTHER PUBLICATIONS

Natvig, Lasse. "High-level Architectural Simulation of the Torus Routing Chip," Department of Computer and Information Systems, Norwegian University of Science and Technology, Mar. 31, 1997.

Dally, William J. et al. "Deadlock-Free Message Routing in Mulitprocessor Interconnection Networks" 5231:TR:86 California Institute of Technology Jun. 30, 1986.

Cypher, Robert et al. "Requirments for Deadlock-Free, Adaptive Packet Routing" 1992.

Berman, Pablo E., et al. "Adaptive Deadlock- and Livelock-Free Routing With All Minimal Paths in Torus Networks," 1992.

Leighton, Tom et al. "Method for Message Routing in Parallel Machines," Mathematics Department and Laboratory for Computer Science, Massachusetts Institute of Technology, 1992.

Pritchard, David J. "Load Balanced Deadlock-Free Deterministic Routing of Arbitrary Networks," Department of Computer Science, University of Liverpool. 1992.

* cited by examiner

SYSTEM AND METHOD FOR AVOIDING DEADLOCK

BACKGROUND OF THE INVENTION

1. Field of the Invention

The present invention relates to computer architectures and, more specifically, to multiprocessor computer architectures.

2. Background Information

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

In multiprocessor computer systems, resources may be shared among the entities or "agents" of the system, such as processors, memory controllers or input/output (I/O) interface devices. Operation of a multiprocessor computer system involves the passing of messages or packets as transactions between the agents of the system. System resources, moreover, are typically configured to support a maximum bandwidth load that may be provided by the agents. In some cases, however, it is not practical to configure a resource to support peak bandwidth loads especially where those conditions are expected to arise only infrequently, i.e., only in the presence of unusual traffic conditions. Resources that cannot support maximum system bandwidth under all conditions require complimentary flow control mechanisms that disallow the unusual traffic patterns resulting in peak bandwidth.

In a credit-based or window flow control system, a receiver gives N credits to a sender. Each time the sender issues a message to the receiver, the sender decrements the number of available credits. As the receiver drains messages from its buffer, it sends new credits to the sender. Thus, the existence of a credit at the sender represents space in the receiver's buffer for accepting a new message. If the number of credits reaches zero, the sender stops issuing messages to the receiver.

FIG. 1 is a block diagram of a multiprocessor computer system 100 organized as a torus. The system includes a plurality of processor nodes (N) 102*a–i* that are interconnected by a plurality of links 104*a–l* that, together with buffering resources, form an interconnection network. Each processor node 102*a–i* may further include local memory and input/output (I/O) resources not shown that are available to the other processor nodes. To exchange information, packets are sent among the processor nodes via the links 104*a–l*. In particular, each processor node may further include a routing agent (not shown) that receives packets from the other nodes and forwards those packets that are destined for a processor node other than the routing agent's local processing node. The nodes may also include one or more buffers, such as buffers 106*a–d* at nodes 102*a* (N0), 102*b* (N1), 102*d* (N3) and 102*e* (N4), respectfully, for buffering packets that have been received at the respective node and that are to be forwarded to some other node.

To select the particular path along which a packet will travel through the interconnection network, the system 100 utilizes a routing function. The routing function may be implemented by a routing algorithm executed by the nodes, or it may be specified in preprogrammed routing tables located at the nodes. The routing function may be static, meaning that the same path is used for every pair of source and destination nodes, or it may be dynamic, in which case, two packets traveling between the same two nodes may nonetheless use different paths, e.g., to avoid congestion. Typically, a shortest path is selected to reduce latency. The routing function may identify a set of output channels for a given packet that in turn defines the path to be taken. In this case, an output selector function is employed to choose one of the identified channels for the given packet. Depending on the topology of the interconnection network and the choice of the routing function, it is possible that one or more cycles will exist among the many paths defined by the routing function. These cycles are also known as loops.

As mentioned above, flow control mechanisms are often applied to the interconnection network of a computer system, e.g., to links 104 of computer system 100. These flow control mechanisms ensure that resources, such as sufficient space in a buffer, exist at a receiving node before a sending node is permitted to send a packet. If the receiving node's buffer is currently full, the flow control mechanism blocks the sending node from issuing the packet. If the interconnection network contains one or more cycles or loops, then the blocking of packets can result in deadlock.

More specifically, suppose node 102*a* (N0) has a packet to send to node 102*e* (N4) and, pursuant to the routing function implemented by system 100, this packet is to travel via node 102*b* (N1). Suppose further that node 102*b* (N1) has a packet to send to node 102*d* (N3) via node N4, that node 102*e* (N4) has a packet to send to node 102*a* (N0) via node N3, and that node 102*d* (N3) has a packet to send to node 102*b* (N1) via node N0. Suppose further that buffer 106*b* at node 102*b* (N1) is full of packets all targeting node N4, that buffer 106*c* at node 102*e* (N4) is full of packets targeting node N3, that buffer 106*d* at node 102*d* (N3) is full of packets targeting node N0, and that buffer 106*a* at node 102*a* (N0) is full of packets targeting node N1. Due to flow control requirements, the full buffer condition at buffer 106*a* precludes node N3 from sending any additional packets to node N0. Likewise, the full buffer conditions at buffers 106*b–d* precludes nodes N0, N1 and N4, respectively, from sending any additional packets. This loop is an example of a circular routing deadlock condition.

One method of avoiding circular routing deadlock is to design the interconnection network to be free of any loops. Some interconnection networks, such as certain tree architectures, are inherently loop-free. Other interconnection networks can be rendered loop-free by fixing the routes that packets must travel between various entities of the computer system. That is, the routes are selected to avoid the formation of any loops. If, for example, the routing function implemented by computer system 100 specified that the path utilized for packets travelling from node N0 to node N4 goes through node N3 rather than node N1, the circular routing deadlock condition described above would be avoided. Although this approach avoids circular routing deadlock, it significantly limits the design of the interconnection network. Indeed, for some complex topologies, such as those having large numbers of processors, it may not be possible to eliminate all of the loops. The requirement of loop-free designs may also preclude the computer system from employing an adaptive routing scheme in which the routing paths can be changed dynamically to avoid congestion.

Another solution to avoiding circular routing deadlock is described in L. Natvig "High-level Architectural Simulation of the Torus Routing Chip", Proceedings of the International Verilog HDL Conference, March–April 1997. Here, time lines and extra virtual channels are added to the interconnection network. Specifically, one or more time lines are logically drawn or imposed onto the system breaking the loops. Furthermore, for each physical (or virtual) channel, a new virtual channel is established. For example, if the system has virtual channels 1, 2 and 3, then new virtual channels 1a, 2a and 3a are established. Whenever a message crosses one of the time lines, it is moved from its current virtual channel into a selected one of the new virtual channels.

Referring to FIG. 1 again, a time line 110 may be placed on link 104a breaking the loop identified above. Messages traversing link 104a are moved from their current channel to one of the newly created channels. For example, a message in virtual channel 2 at node 102a (N0) that is to be transmitted across link 104a is placed in a new buffer (not shown) at node 102b (N1) that corresponds to virtual channel 2a. By drawing the time lines at appropriate places within the interconnection network, circular routing deadlock can generally be avoided.

The addition of a second set of virtual channels, however, increases the complexity of the computer system and requires the deployment of greater resources, which typically increases the cost. Furthermore, in some cases, such as when using industry standard components, it may not be possible or practical to establish new virtual channels. Accordingly, a need exists for an alternative system and method for avoiding deadlock.

SUMMARY OF THE INVENTION

Briefly, the invention relates to a system and method for avoiding deadlock, such as circular routing deadlock, in a computer system. The computer system preferably includes a plurality of processors, a main memory and an interconnection network that couples the processors to themselves and to the main memory. In particular, the interconnection network preferably employs a plurality of routing agents for interconnecting the processors and main memory. Communication among the processors and main memory takes place through the exchange of transaction packets or messages.

In the illustrative embodiment, each routing agent has at least one buffer for storing packets that are to be forwarded by the routing agent. Furthermore, at least one or more loops are present in the interconnection network. To prevent the buffers or resources at the routing agents that reside in a loop from becoming full or saturated and deadlocking the system, a virtual buffer is established. The virtual buffer is disposed in main memory, and can thus provide nearly infinite capacity. In particular, the virtual buffer corresponds to a range of memory that is set aside for use by the routing agent. When the routing agent suspects that a deadlock condition has arisen within the system, e.g., its buffer becomes and remains full for some time, thereby preventing the routing agent from accepting any additional packets, the routing agent transfers at least one packet from the buffer into the virtual buffer. By transferring a packet out of the buffer, the routing agent frees up space allowing it to accept a new packet. If the newly accepted packet also results in the buffer becoming full, the routing agent transfers at least one other packet into the virtual buffer. This process of moving packets out of the routing agent's buffer and into the virtual buffer, and of accepting new packets is repeated until the deadlock condition is resolved. Once the deadlock condition is resolved and packets are again able to progress through the system, those packets that were transferred into the virtual buffer are retrieved and forwarded by the routing agent.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
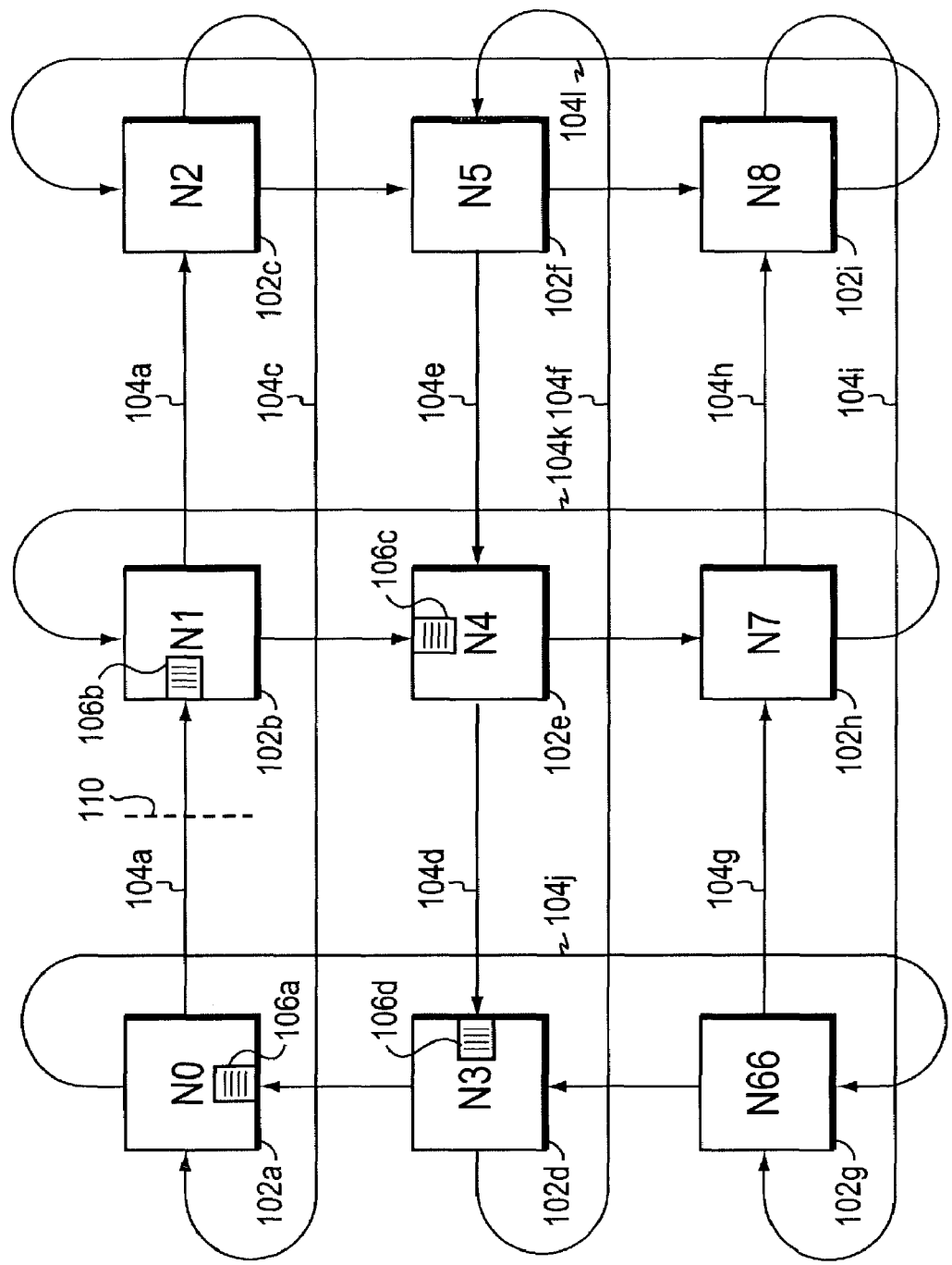
FIG. 1, previously discussed, is a schematic illustration of a prior art multiprocessor computer system.
Figure 2:
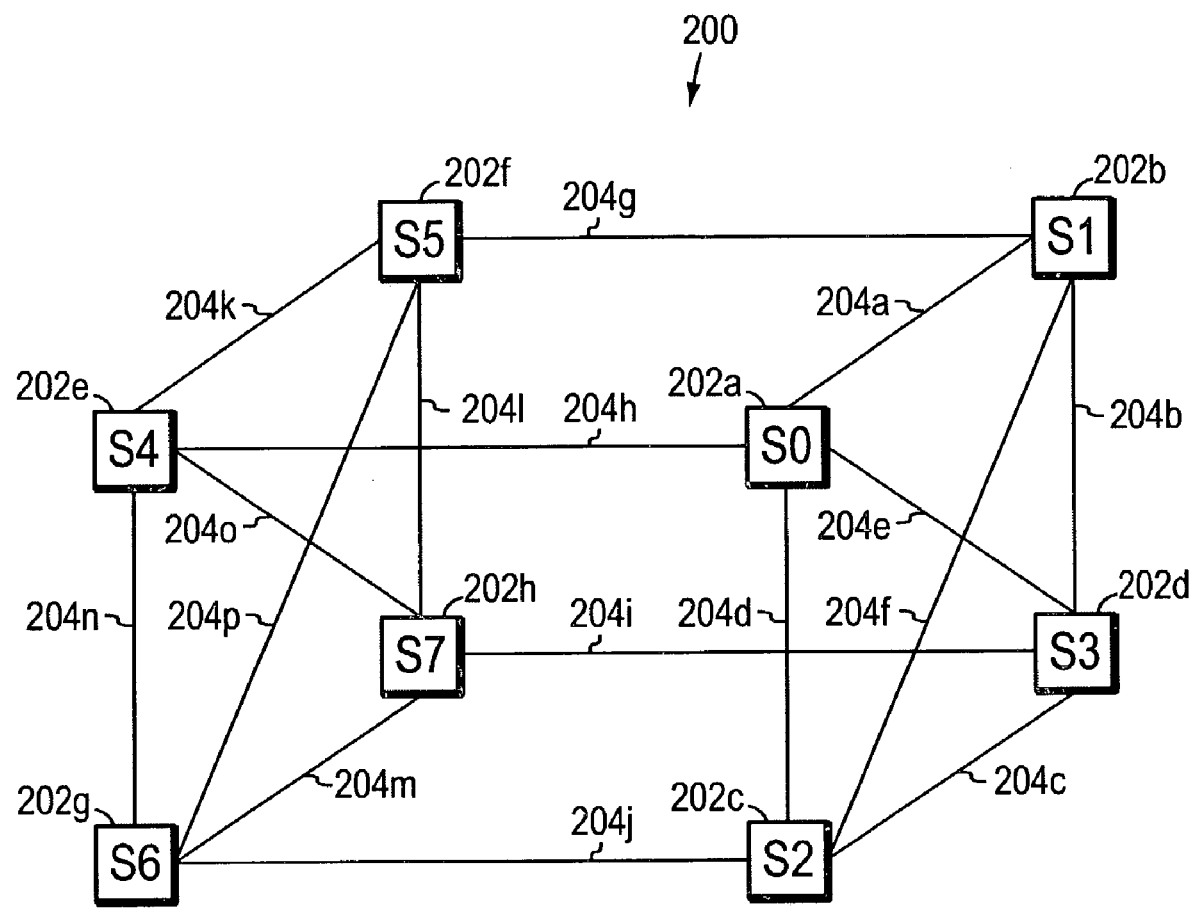
FIG. 2 is a highly schematic diagram of a multi-processor computer node with which the present invention may be advantageously used.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
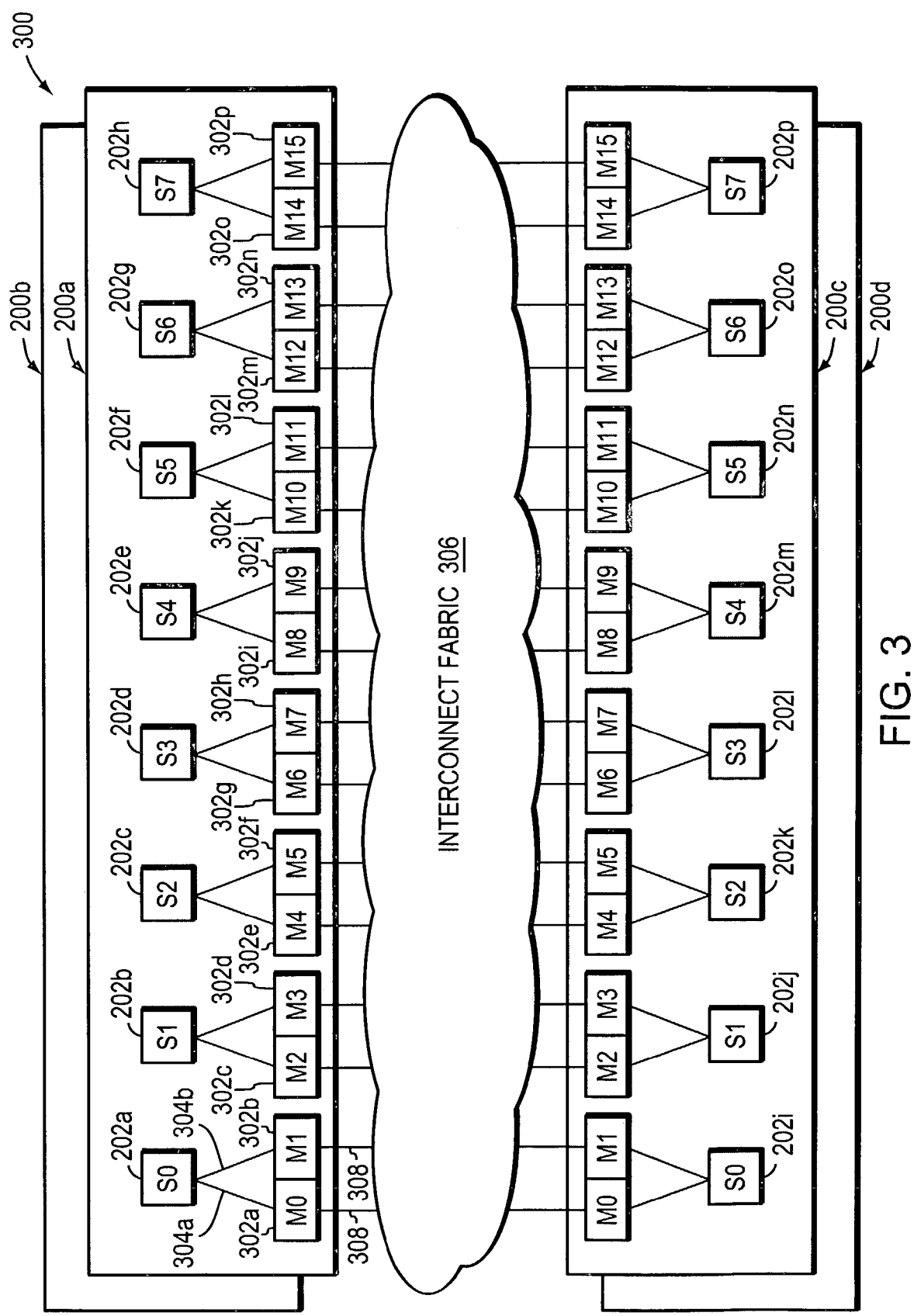
FIG. 3 is a highly schematic diagram of a computer system formed from a plurality of multi-processor nodes.

FIG. 3 is a highly schematic illustration of a computer system 300 formed by interconnecting a plurality of nodes. In particular system 300 comprises four nodes 200a–d, each of which corresponds to node 200 (FIG. 2), although the inter-processor links have been omitted for clarity. As described above, each node, such as nodes 200a and 200c, has eight sockets, such as sockets 202a–h and 202i–p, respectively. Each node also includes a plurality of main memory subsystems (M0–M15). In the preferred embodiment, each node has sixteen memory subsystems, two for each socket. The sixteen memory subsystems M0–M15 of node 200a are designated by reference numerals 302a–p. Each socket is coupled to a pair of memory subsystems by a corresponding pair of processor/memory links. Socket 202a, for example, is coupled to memory subsystems 302a and 302b by processor/memory links 304a and 304b, respectively.

The four nodes 200a–d, moreover, are fully interconnected with each other through an interconnect fabric 306. Specifically each memory subsystem, such as subsystems 302a and 302b, are connected to the interconnect fabric 306 by fabric links 308. In the preferred embodiment, each memory subsystem at a given node is coupled to its corresponding memory subsystem at the other three nodes via an interconnect plane (not shown). That is, memory subsystem M0 at node 200a is coupled by three bi-directional fabric links to the three other M0 memory subsystems at nodes 202b–d, memory subsystem M1 at node 200a is coupled by three bi-directional fabric links to the three other M1 memory subsystems at nodes 202b–d, and so on. In other words, six fabric links are used to fully interconnect each set of four memory subsystems, e.g., six links interconnect the four M0 memory subsystems, six links interconnect the four M1 memory subsystems, etc. In the illustrative embodiment, each memory subsystem executes both memory and routing functions. That is, each of the memory subsystems includes a routing agent for passing messages among the entities of the computer system 300.

In a preferred embodiment, the computer system 300 is a shared-memory multi-processor (SSMP) system or a cache coherent Non-Uniform Memory Access (cc-NUMA) system. Nonetheless, those skilled in the art will recognize that the present invention may be utilized with other systems.

Figure 4:
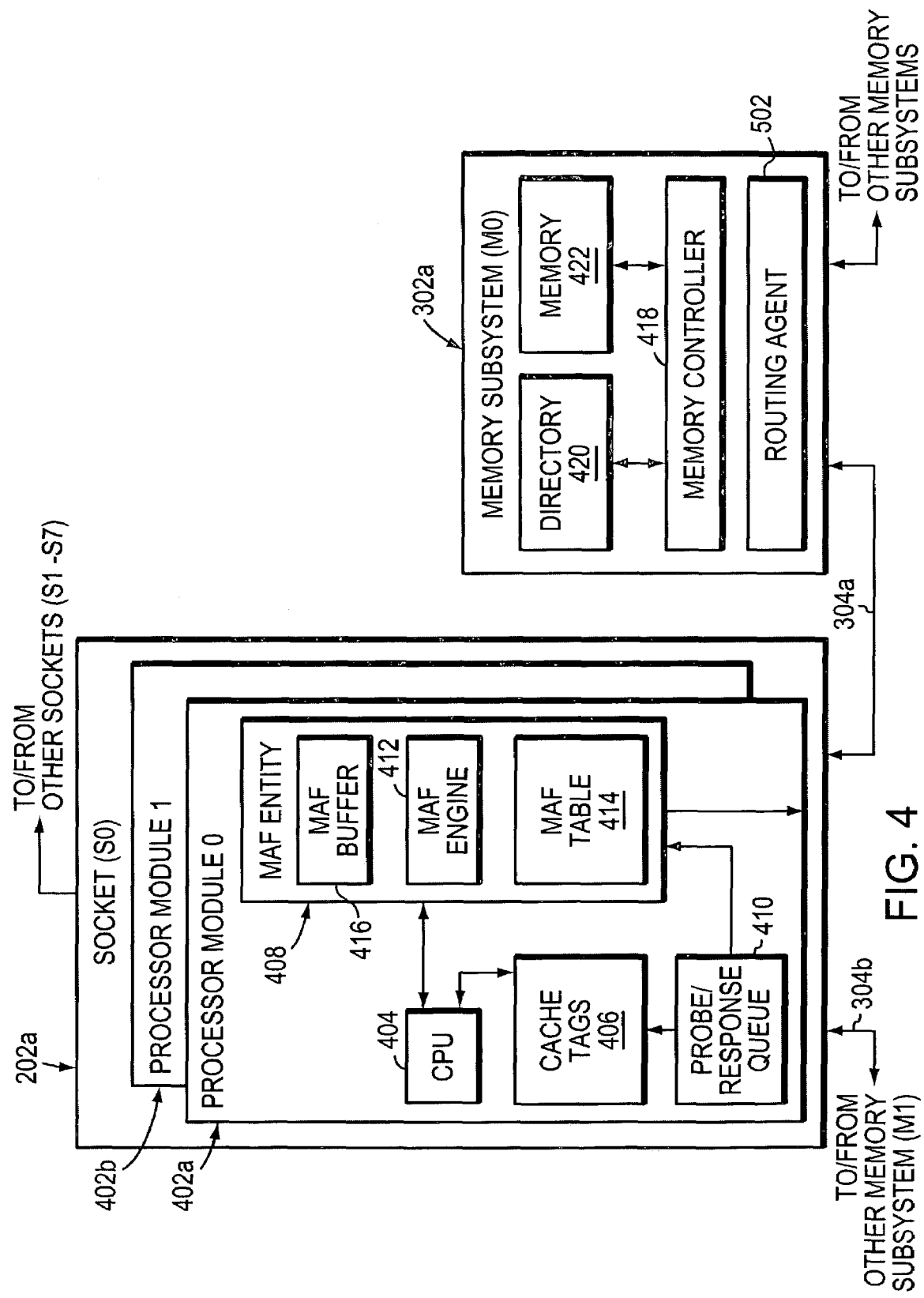
FIG. 4 is a highly schematic diagram of a processor socket and memory subsystem of the computer system of FIG. 3.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) at one or more levels that are in close proximity to the CPU for storing data that the CPU 404 is currently using or is likely to use in the near future. Information regarding the status of the data stored in the processor cache(s), such as the address and validity of that data, is maintained in the cache tags storage device 406. The MAF entity 408, which keeps track of commands, such as memory reference requests, issued to the system, has a MAF engine 412 and a MAF table 414. MAF entity 408 may also include one or more buffers, such as MAF buffer 416.

Processor module 402b similarly includes a CPU, a cache tags storage device, a MAF entity and a probe/response queue. Socket (S0) 202a is coupled to the other sockets (S1–S7) of node 200a by inter-socket links and to memory subsystems (M0) 302a and (M1) 302b by processor/memory links 304a and 304b, respectively.

It should be understood that each processor module 402 may also include other components, such as a routing agent, a write back or victim buffer, a register file, a translation look-aside buffer (TLB), load/store (L/S) queues, etc.

The memory subsystem (M0) 302a has a routing agent 502, a memory controller 418, a directory 420 and one or more memory modules or banks, such as memory unit 422. Memory unit 422 may be and/or may include one or more conventional or commercially available dynamic random access memory (DRAM), synchronous DRAM (SDRAM), double data rate SDRAM (DDR-SDRAM) or Rambus DRAM (RDRAM) memory devices, among other memory devices.

It should also be understood that each socket 202 may further include one or more input/output (I/O) subsystems (not shown), such as an I/O bridge, that connects one or more I/O devices or peripherals to the computer system 300. The I/O subsystems, moreover, may have their own private caches for buffering data, and the I/O devices may be granted access to some or all of the computer system's main memory through the I/O subsystems.

The inter-processor links 204, processor/memory links and associating routing agents combine to form an interconnection network of the computer system 300

The memory subsystems of nodes 200a–d combine to form the main memory of the computer system 300 some or all of which may be shared among the processors. Each socket 202, moreover, includes a portion of main memory by virtue of its respective memory subsystems 302. Data stored at the memory units 422 of each subsystem 302, moreover, is organized into separately addressable memory blocks that are equivalent in size to the amount of data stored in a processor cache line. The memory blocks or cache lines are preferably of uniform, fixed size, and represent the smallest unit of data that can be moved around the computer system 300. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the computer system 300, has a pre-determined home memory subsystem that does not change. Each directory 420, moreover, maintains status information for the cache lines for which its memory subsystem is the home memory. In other words, rather than having a single, centralized directory, the "directory" for the computer system 300 is distributed across all of the memory subsystems.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The processors 404 and memory subsystems 302 interact with each other by sending "command packets" or simply "commands" to each other. Commands may be classified generally into three types: Requests, Probes and Responses. Requests are commands that are issued by a processor when, as a result of executing a load or store operation, it must obtain a copy of data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes are commands issued to one or more processors requesting data and/or cache tag status updates. Probe commands include Forwarded_Read (FRead) commands, Forwarded_Read_Modify (FReadMod) commands, and Invalidate (Inval) commands, among others. Responses are commands which carry requested data to a processor or acknowledge some request. For Read and ReadMod commands, the responses are Fill and Fill_Modify (FillMod) commands, respectively. For CTD commands, the responses are CTD_Success or CTD_Failure commands. For WB commands, the response may be a WB_Acknowledgement command.

In the illustrative embodiment, the processors and memory subsystems of the computer system 300 cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownership-based" implies there is always an identifiable owner for a cache line, whether it is memory or one of the processors of the computer system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Virtual Channels

As indicated above, memory reference operations, such as reads, from a processor are preferably executed by the computer system 300 through a series of steps where each step involves the exchange of a particular command among the processors and shared memory subsystems. The potential for deadlock is avoided in part through the creation of a plurality of channels. Preferably, the channels share physical resources and are thus "virtual" channels. Each virtual channel, moreover, is assigned a specific priority relative to the other virtual channels so that, by appropriately assigning the different types of commands to different virtual channels, the computer system 300 can also eliminate flow dependence. In general, commands corresponding to later steps in a given series are assigned to higher priority virtual channels than the commands corresponding to earlier steps.

In the illustrative embodiment, the computer system 300 maps commands into at least three (3) virtual channels that are preferably implemented through the use of queues. A Q0 channel carries processor command request packets for memory space read and write transactions. A Q1 channel accommodates command probe packets that are responsive to Q0 requests. A Q2 channel carries command response packets that are responsive to Q0 requests and to Q1 probes.

A suitable mechanism for implementing virtual channels in a large computer system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The virtual channels, moreover, can be configured to carry other types of command packets. The Q0 virtual channel, for example, may also accommodate processor command request packets for programmed input/output (PIO) read and write transactions, including control status register (CSR) transactions, to input/output (I/O) address space.

Figure 5:
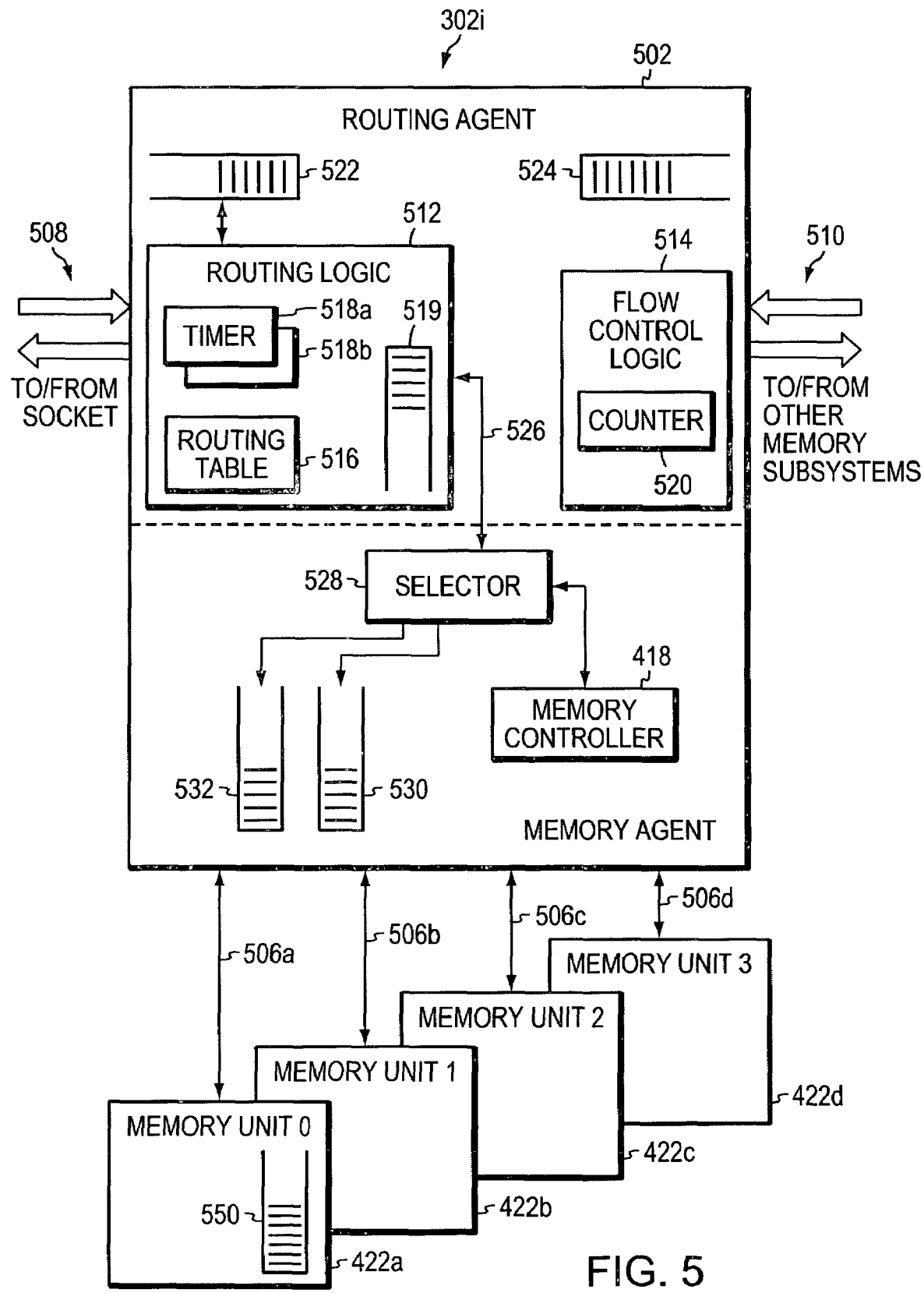
FIG. 5 is a highly schematic, partial block diagram of a combination routing agent/memory controller of the computer system of FIG. 3.

FIG. 5 is a functional block diagram of a memory subsystem, such as subsystem 302i, in accordance with a preferred embodiment of the present invention. Memory subsystem 302i preferably includes a routing agent 502 and a memory agent 504 that is coupled to a plurality of memory units 422a–d by corresponding memory channels 506a–d. As schematically illustrated by arrows 508, the routing agent 502 is coupled to its corresponding socket. The routing agent 502 is also coupled to three other memory subsystems 302 as schematically illustrated by arrows 510. The routing agent 502 preferably includes routing logic 512 and flow control logic 514. The routing logic 512, moreover, includes or has access to a routing table 516 and a plurality of timers, such as timers 518a–b. In the illustrative embodiment, it also includes a retrieved command buffer 519. The flow control logic 514 includes one or more credit counters, such as counter 520. The routing agent 502 further includes one or more buffers, such as socket buffer 522 configured to store temporarily commands received from the respective socket, and interconnect buffer 524 configured to store temporarily commands received from the other memory subsystems 302 via the interconnect fabric 306. The routing agent 502 can also communicate with the memory agent 504 as schematically illustrated by arrow 526.

It should be understood that the routing agent 502 may include other components, such as transmit (Tx) and receive (Rx) circuitry, registers, etc.

The memory agent 504 includes a memory controller 418 configured to store information in the memory units 422 and to retrieve information stored therein. The memory agent 504 may also include a selector circuit 528 that interfaces with the routing agent 502. The selector circuit 528 is coupled to a plurality of buffers, such as a primary buffer 530 and a deadlock avoidance buffer 532, both of which may be disposed at the memory agent 504. As described herein, the selector circuit 528, operating under the control of the memory controller 418, directs information, such as entire commands or portions thereof, received from the routing agent 502 into a selected one of the buffers 530 and 532. Information from buffers 530 and 532 is then moved into a selected memory device 422a–d.

In operation, commands from the socket are received at the routing agent 502 via the links represented by arrows 508. The routing agent 502 temporarily stores the received commands at socket buffer 522. The routing logic 512 examines the commands to determine whether they target the corresponding memory agent 504, or some other entity of the computer system 300. Commands that are destined for memory agent 504 are removed from the socket queue 522 and handed down to the memory agent 504. Specifically, the memory controller 418 activates selector circuit 528 to direct commands received from the routing agent 502 into a selected one of the buffers 530, 532. In accordance with the present invention, commands destined for memory agent 504 are preferably directed into the primary buffer 530.

The memory controller 418 then executes the command received into the primary buffer 530. If the command is a read command, for example, the memory controller 418 examines the directory entry for the specified memory block and, assuming the block is owned by memory, the memory controller 418 retrieves the specified block from the memory unit 422 at which it is stored, and returns it to the source of the read command. If the directory entry indicates that some other entity besides memory currently owns the block, the memory controller 418 preferably generates a forward or snoop command, which is then transmitted by the routing agent 502 to the entity that currently owns the specified block directing it to service the read command. If the command is a write command, the memory controller 418 preferably writes the block to a particular memory unit 422 and updates the directory for the memory block accordingly.

A suitable cache coherency protocol for use with the present invention is described in commonly owned, copending U.S. patent application Ser. No. 10/263,739, titled Directory Structure Permitting Efficient Write-Back in a Shared Memory Computer System, which is hereby incorporated by reference in its entirety.

Commands that target another entity besides memory subsystem 302i are forwarded to the interconnect fabric 306 for receipt by another memory subsystem 302 of the computer system 300. That is, these commands are removed from the socket buffer 522, and provided to Tx circuitry for transmission through the interconnect fabric 306 as represented by arrows 510. As indicated above, each memory subsystem 302 is coupled to three (3) other memory subsystems. The routing logic 512 preferably performs a lookup on its routing table 516 using information from the command to determine which of the other three memory subsystems 302 the command is to be sent.

As mentioned above, the computer system 300 preferably implements a flow control mechanism to control the flow of commands among the entities of the system 300. In general, each memory subsystem 302, which acts as both a sender and receiver, exchanges credits with the other memory subsystems 302 and with the socket to which it is connected. These credits indicate whether resources are available at a given, i.e., destination, socket or memory subsystem to receive commands from the source memory subsystem. Memory subsystem 302i must have an available credit before it can send a command to the socket or to another memory subsystem.

Flow control logic 514 preferably keeps track of such credits. Specifically, each time a command is sent to the socket or to a particular memory subsystem 302, the flow control logic 514 at memory subsystem 302i operates its credit counter 520 to reflect the consumption of a credit. When the socket or destination memory subsystem 302 drains a command from its buffer, such as interconnect buffer 524, thereby freeing up space in the buffer to receive another command, it issues a credit to memory subsystem 302i. The flow control logic 514 at memory subsystem 302i responds by operating its credit counter 520 to reflect the availability of a credit. If the credit counter 520 indicates that there is no space in the buffer of a target socket or memory subsystem 302, then a command cannot be sent to that socket or memory subsystem until sufficient space becomes available, as reflected by the receipt of a credit.

A suitable flow control mechanism for use with the present invention is described in C. Ozveren, R. Simcoe and G. Varghese, Reliable and Efficient Hop-by-Hop Flow Control, ACM SIGCOMM 1994, which is hereby incorporated by reference in its entirety.

It should be understood that the computer system 300, like most multiprocessor systems, is preferably configured to prevent messages or commands from being dropped or discarded. That is, the computer system 300 is designed such that all messages are delivered. This improves system performance by reducing latency and eliminating retries. Furthermore, the routing tables 516 are preferably configured to implement shortest-path routing. The routing logic may implement static or dynamic (also referred to as adaptive) routing. The present invention may also be utilized whether the computer system 300 implements store-and-forward or wormhole routing.

Figure 6:
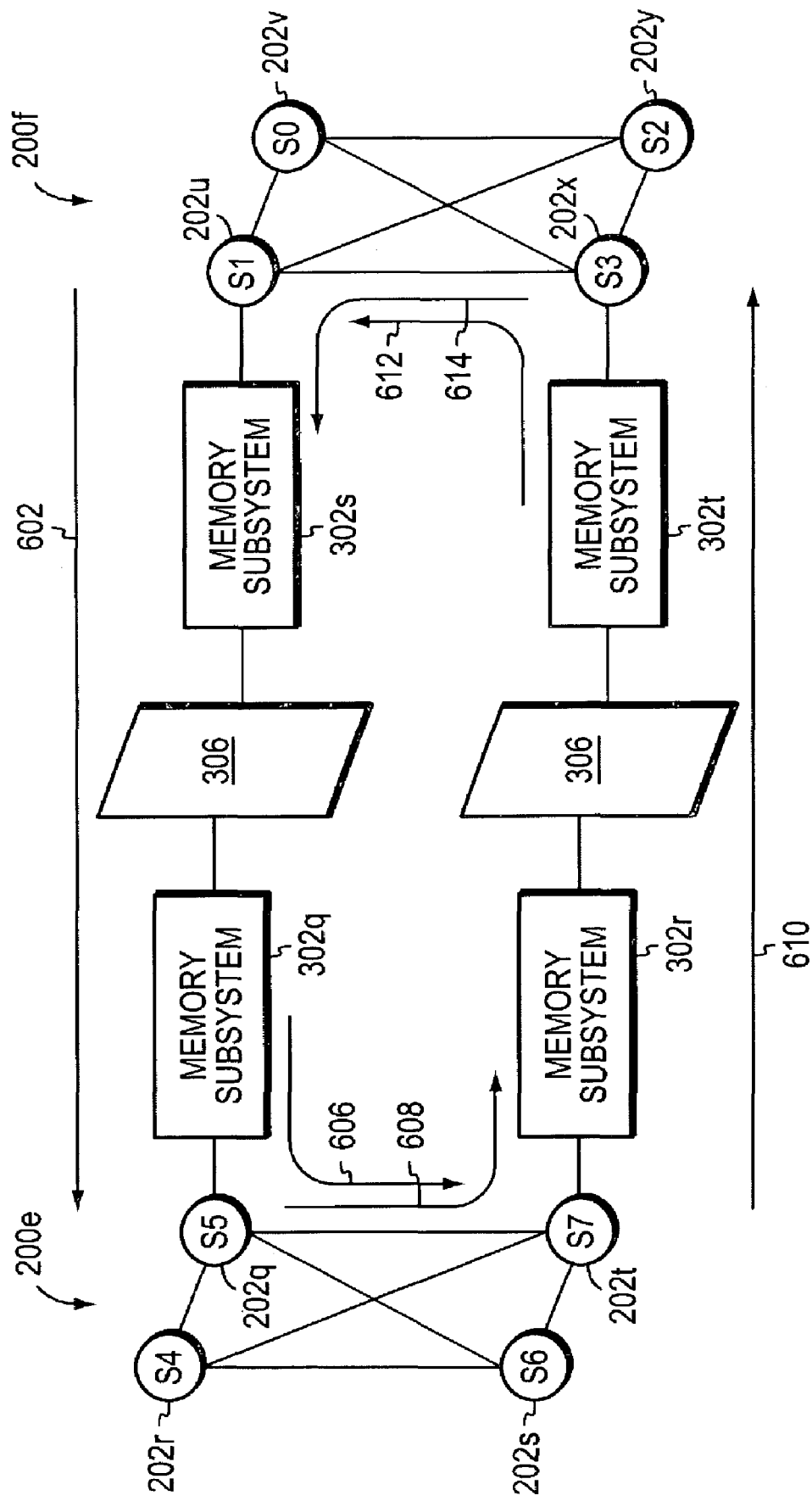
FIG. 6 is a partial diagram of the computer system of FIG. 3, illustrating the potential for deadlock.

FIG. 6 is a highly schematic, partial illustration of the computer system 300 illustrating the potential for deadlock. As shown, the system 300 includes a plurality of, e.g., four, memory subsystems 302q–t that are coupled by planes of the interconnect fabric 306. Each memory subsystem 302q–t, moreover, is coupled to a respective socket of a node 200e–f. In the illustrative embodiment, each node 200e–f is preferably designed to eliminate the potential for circular routing deadlock within the node. Specifically, as shown in FIG. 2, two opposing faces of node 200 are fully meshed and thus there can be no loops among these nodes as none is more than one hop away from any other. For those sockets of node 200 that are more than one hop away from each other, such as sockets 202c (S2) and 202f (S5), the routing agents at these sockets are programmed to eliminate loops. For example, the routing agents at the sockets are configured such that commands going from socket 202c to socket 202f as well as commands going from socket 202f to socket 202c pass through socket 202b. In this way, the loop formed by sockets 202b (S1), 202f (S5), 202g (S6) and 202c (S2) is broken.

Furthermore, because each memory subsystem is fully connected to three other memory subsystems, there are no loops among the memory subsystems themselves. However, loops do exist among the paths that extend between the memory subsystems 302 and the sockets 202. Therefore, circular routing deadlock may occur within the computer system 300.

Referring to FIG. 6, for example, suppose socket 202u (S1) has a command to be sent to socket 202q (S5) on the Q2 virtual channel, as illustrated by arrow 602. Suppose also that memory subsystem 302q has a command to be sent to socket 202t (S7) on the Q2 virtual channel, as illustrated by arrow 606, that socket 202q (S5) has a command to be sent to memory subsystem 302r on the Q2 virtual channel, as illustrated by arrow 608, that socket 202t (S7) has a command to be sent to socket 202x (S3), as illustrated by arrow 610, that memory subsystem 302t has a command to be sent to socket 202u (S1), as illustrated by arrow 612, and that socket 202x (S3) has a command to be sent to memory subsystem 302s on the Q2 virtual channel, as illustrated by arrow 614. If the buffers along the paths made up of each of the entities on this loop are currently full, then a deadlock condition will result. The present invention avoids the occurrence such deadlock conditions.

It should be understood that, as Q0 requests are issued by processors to main memory, such commands generally flow from the loop-free multiprocessor nodes 200 into the loop-free memory subsystems. Accordingly, no loops are present on the Q0 channel. Similarly, as Q1 responses are issued by main memory to the processors, such commands generally flow from the loop-free memory subsystems 302 to the loop-free multiprocessor nodes 200. Accordingly, no loops are present on the Q1 virtual channel. As suggested above, however, Q2 commands can be issued by and can target either the processors or the memory subsystems. Accordingly, loops are present on the Q2 virtual channel in the design of computer system 300.

As mentioned above, commands received by the routing agent 502 (FIG. 5) from its respective socket are temporarily stored at socket buffer 522 prior to being forwarded and, as commands are removed from the socket buffer 522 flow control credits are released allowing additional commands to be sent to the routing agent 502. When the buffer 522 becomes full, it cannot accept any further commands from the socket. In this case, no flow control credits are available. The socket buffer 522 may have become full or saturated state because of a deadlock condition within the computer system 300.

In accordance with the present invention, when the socket buffer 522 becomes full, the routing logic 512 preferably commences timer 518a. The timer 518a is aborted if routing logic 512 removes a command from the buffer 522. That is, if the routing agent 502 can forward one or more commands, thereby freeing up space in buffer 522 and permitting the routing agent 502 to accept one or more new commands, routing logic 512 aborts timer 518a. If, however, the timer 518a expires, i.e., the routing agent 502 was unable to forward any commands during that period, the routing logic 512 presumes that a deadlock condition has arisen within the computer system 300. In response, the routing logic 512 preferably transfers one or more commands from the socket buffer 522 to a virtual buffer, such as virtual buffer 550, established in one or more of the memory units that make up the main memory of the computer system 300, namely memory unit 422a. By transferring one or more commands to the virtual buffer 550, the routing logic 512 frees up space in the socket buffer 522, thereby allowing the routing agent 502 to accept one or more new commands.

Specifically, the routing logic 512 removes one or more commands from the socket buffer 522. Preferably, the routing logic removes one or more commands from the tail of the buffer although it could select commands from the head or other locations of the buffer 522. The removed command(s) are passed by the routing agent 502 to the memory agent 504 via selector circuit 528. Memory controller 418 preferably operates selector circuit 528 such that the command(s) removed from the socket buffer 522 and destined for the virtual buffer 550 are placed into the deadlock avoidance buffer 532, rather than the primary buffer 530. The memory controller 418 then transfers the commands from the deadlock avoidance buffer 532 into the virtual buffer 550 established at memory unit 422a.

It should be understood that the virtual buffer 550 is a region of main memory, such as a set of memory blocks, that is set aside for use by the routing agent 502 as a place to temporarily store commands in response to the occurrence of a deadlock condition. In the illustrative embodiment, the region of main memory that is set aside as the virtual buffer 550 is preferably not available to other SMP entities. If, for example, a processor were to issue a read or write command to a memory block that is part of the virtual buffer 550, the memory controller 418 preferably returns an error message, such as a non-existent memory location (NXM) error message, to the processor.

Upon transferring one or more commands from the socket buffer 522 to the virtual buffer 550, the flow control logic 514 at the routing agent 502 preferably releases a corresponding number of flow control credits to the socket. The socket, in turn, can utilize these flow control credits to issue new commands to the routing agent 502. The new commands are temporarily stored at the socket buffer 522, which now has space to accept the new commands.

If, upon receipt of the new command(s), the socket buffer 522 is again full, the routing logic 512 preferably commences another timer, e.g., timer 518b. As described above in connection with the first timer 518a, if a command is removed from the socket buffer 522, the second timer 518b is aborted. If the second timer 518b expires, the routing logic 512 presumes that the deadlock condition still exists. In response, the routing logic 512 removes one or more additional commands from the socket buffer 522 and transfers them to the virtual buffer 550. That is, the routing logic 512 removes one or more commands and passes them to the memory agent 504 for storage in the virtual buffer 550.

It should be understood that the second timer 518b may be started at other times, such as when the one or more commands are removed from the socket buffer 522, when the corresponding flow control credits are released or at other times.

When the deadlock condition resolves, the routing agent 502 will begin receiving flow control credits, thereby allowing it to forward commands again. As the routing agent 502 starts to receive flow control credits, it preferably retrieves one or more of the commands that were previously transferred to the virtual buffer 550. For example, the routing logic 512 may issue an instruction to the memory controller 418 directing it to retrieve one or more of the commands. Preferably, the commands returned to the routing agent 502 are temporarily stored in the retrieved command buffer 519. The routing logic 512 examines the commands in its retrieved command buffer 519 and, using its routing table 516, determines how those commands are to be forwarded.

In the illustrative embodiment, commands returned from the virtual buffer 550 are preferably arbitrated with commands that are at the head of the socket buffer 522 for access to the flow control credits received by the routing agent 502. Nonetheless, those skilled in the art will recognize that other options are also available. For example, if point-to-point network order is required, the routing logic 512 may be configured to keep track of the location of commands removed from the socket buffer 522. When those commands are returned, they may be treated as thought they had never been removed from the socket buffer 522. In other words, for forwarding purposes, the retrieved commands are considered to be in the buffer position that they would otherwise have been in had they not been removed at all. In the preferred embodiment, the retrieved commands are not placed back in the socket buffer 522.

The values selected for the two timers 518a and 518b depend upon the latencies in the computer system 100, especially the latency through the routing agents 502, the amount of contention that is anticipated for shared resources as well as an acceptable frequency of "false alarms", i.e., situations in which the timers expire but no deadlock condition has actually arisen. Typically, both values are on the order of a few microseconds. Considering the illustrative embodiment described herein, a suitable value for the first timer 518a is approximately 2.0 microseconds, and a suitable value for the second timer 518b is approximately 0.5 microseconds. Nonetheless, those skilled in the art will recognize that other values may be used. In addition, routing logic 512 may be configured to begin transferring commands to the virtual buffer 550 as soon as the socket buffer 522 becomes full. That is, the routing logic 512 may not utilize first and/or second timers 518a–b at all. Furthermore, those skilled in the art will recognize that a single timer may be utilized to implement the values represented by both timer 518a and timer 518b.

As shown, by providing a virtual buffer 550 at each memory subsystem 302, the present invention is able to avoid deadlock without having to create any new virtual channels. Furthermore, from the point of view of the computer system 300, the socket buffers 522 appear to have a nearly infinite capacity. That is, with the addition of the virtual buffers 550, the routing agents 502 can always accommodate another message from their respective sockets. Each virtual buffer 550 basically extends the tail of its respective socket buffer 522 to an infinite length. As a practical matter, because the number of commands that can be outstanding in the computer system 300 is bounded, the virtual buffers 550 are limited in size. In particular, the size of the virtual buffer is a function of the number of commands that can be outstanding per processor, the number of processors and the size of the commands. Considering the illustrative embodiment described herein, the virtual buffers 550 are preferably on the order of eight Megabytes each. Nonetheless, given the large size of the main memory, e.g., on the order of 256 Gigabytes, the amount of memory set aside for the virtual buffers is almost insignificant.

It should be understood that the memory agent 504 may have one or more registers (not shown) that can be programmed with the range of memory addresses to be set aside for the virtual buffer 504. Upon boot-up of the computer system 300, firmware loads these registers with predetermined values to establish the size and location of the virtual buffers within main memory.

It should be understood that each memory subsystem 302 preferably has at least one virtual buffer 550 as described herein.

As mentioned above, each multiprocessor node 200 is configured in such a way as to prevent circular routing deadlock from occurring within the nodes themselves. Accordingly, in the computer system 300 described herein, loops are only present in paths that include both sockets and memory subsystems. Therefore, providing a virtual buffer for each of the socket buffers 522 is sufficient to break all of the loops. That is, virtual buffers are not needed for both the socket buffers 522 and the interconnect buffers 524. Nonetheless, those skilled in the art will recognize that a second virtual buffer (not shown) could be established for one or more of the interconnect buffers 524 if desired or, in another alternative, virtual buffer 550 could be shared by buffers 522 and 524.

In yet another embodiment, the virtual buffers could be established for the interconnect buffers 524 rather than for the socket buffers 522 to eliminate occurrences of circular routing deadlock.

Although it has been described in connection with a particular interconnection network design, those skilled in art will understand that the present invention can be used with other designs, such as tori, cubes, hypercubes, trees, meshes, butterflies, etc. Furthermore, depending on the design of the particular interconnection network at issue, virtual buffers may only need to be established at one or more key points in the network.

In the illustrative embodiment, the routing agent 502 and the memory agent 504 are formed or disposed on a single module, such as a single field programmable gate array (FPGA) or application specific integrated circuit (ASIC) device. Those skilled in the art will recognize that, although this may be a preferred arrangement as it provides faster communication between the routing agent and its respective memory agent, the two entities may be formed or disposed on different modules that are in communicating relationship with each other. Nonetheless, to avoid undesirable latencies given the fact that network bandwidth is often much higher than memory bandwidth, the routing agent is preferably placed in close temporal relationship to main memory (or at least a portion thereof). Preferably, the latency to pull commands out of main memory is on the order of 50 nanoseconds.

It should be understood that the inclusion of the retrieved command buffer 519 offsets some of the latency resulting from main memory having a lower bandwidth than the interconnection network. Nonetheless, those skilled in the art will recognize that the retrieved command buffer 519 may be eliminated and commands may be forwarded as soon as they are retrieved from the virtual buffer 550.

The foregoing description has been directed to specific embodiments of the present invention. It will be apparent, however, that other variations and modifications may be made to the described embodiments, with the attainment of some or all of their advantages. For example, those skilled in the art will recognize that the interconnection network and thus the socket and virtual buffers may be configured to transmit and store other communication elements besides commands, such as transactions, messages, packets, flits, etc. Therefore, it is the object of the appended claims to cover all such variations and modifications as come within the true spirit and scope of the invention.

What is claimed is:

1. A computer system comprising:
   a main memory;
   a plurality of processors;
   one or mare routers interconnecting the processors and the main memory, each router having at least one buffer; and
   a virtual buffer disposed at the main memory, wherein
   the processors and main memory communicate with each other by exchanging communication elements through the one or mare routers,
   at least some of the communication elements received at the one or more routers are stored at the respective buffers, and
   at least one router transfers one or more communication elements from its buffer to the virtual buffer when the buffer becomes full in order to avoid deadlocks in the computer system.

2. The computer system of claim 1 wherein the virtual buffer is formed from a region of main memory.

3. The computer system of claim 2 wherein the region of main memory forming the virtual buffer is only accessible by the at least one router.

4. The computer system of claim 1 wherein a separate virtual buffer is provided for each of the one or more routers.

5. The computer system of claim 1 wherein the at least one router waits a predetermined time after its buffer becomes full before transferring the one or more communication elements to the virtual buffer.

6. The computer system of claim 5 wherein
   the at least one router further includes a timer,
   when the buffer becomes full, the at least one router activates the timer,
   if a communication element is removed from the buffer, the timer is aborted, and
   if the timer expires, the at least one router transfers the one or more communication elements to the virtual buffer.

7. The computer system of claim 6 wherein
   the at least one router further includes a second timer,
   if upon removing the one or more communication elements the buffer is again full, the at least one router activates the second timer,
   if a communication element is removed from the buffer, the second timer is aborted, and
   if the second timer expires, the at least one router transfers one or more additional communication elements to the virtual buffer.

8. The computer system of claim 1 further comprising a flow control mechanism configured to prevent communication elements from being sent to a given router when the buffer at the given router is full.

9. The computer system of claim 8 wherein the flow control mechanism utilizes credits exchanged among the one or more routers to indicate when the buffer at the given router can accept a new packet and when the buffer cannot.

10. The computer system of claim 4 wherein the main memory is distributed among a plurality of memory subsystems, each memory subsystem having a memory controller for accessing its portion of the distributed main memory.

11. The computer system of claim 10 wherein each of the one or more routers and an associated memory controller are disposed on a single module.

12. The computer system of claim 11 wherein to single module is one of a field programmable gate array (FPGA) device and an application specific integrated circuit (ASIC) device.

13. The computer system of claim 1 wherein the communication elements are one or more of transactions, messages, commands, packets, and flits.

14. A method comprising:
   providing a computer system having a plurality of processors, a main memory, an interconnection network for coupling the processors and the main memory, and a buffer in the interconnection network, the processors and the main memory configured to communicate by exchanging communication elements;

storing at least some of the communication elements being exchanged by the processors and main memory the buffer;

providing a virtual buffer in main memory, the virtual buffer associated with the buffer at the interconnection network; and when the buffer at the interconnection network becomes full of communication elements, avoiding deadlock in the computer system by transferring one or more communication elements from the buffer to the virtual buffer thereby allowing the buffer to accept one or more new communication elements.

15. The method of claim 14 further comprising returning the one or more communication elements that had been transferred from the interconnection network into the virtual buffer back to the interconnection network.

16. The method of claim 15 wherein
the interconnection network comprises a plurality of interconnected routing agents,
each routing agent has at least one buffer for storing communication elements being exchanged by the processors and main memory, and
a separate virtual buffer is provided for each of the routing agents.

17. The method of claim 15 further comprising rendering the virtual buffer inaccessible by the processors.

18. The method of claim 16 wherein each virtual buffer is formed from a different region of main memory.

19. The method of claim 14 further comprising:
commencing a first timer when the buffer becomes full of communication elements;
aborting the first timer if a communication element is removed from the buffer, and
if the first timer expires, performing the transferring one or more communication elements from the buffer to the virtual buffer.

20. The method of claim 19 further comprising:
if the buffer becomes full upon accepting one or more new communication elements, commencing a second timer;
aborting the second timer if a communication element is removed from the buffer, and
if the second timer expires, transferring one or more additional communication elements from the buffer at the interconnection network to the virtual buffer, wherein
the second timer is shorter in duration than the first timer.

21. The method of claim 14 wherein
the main memory is organized into a plurality of separately addressable memory blocks, and
the virtual buffer is formed from a selected set of memory blocks whose addresses are considered non-existent by the processors.

22. The method of claim 14 wherein the communication elements are one or more of transactions, messages, commands, packets, and flits.

* * * * *

UNITED STATES PATENT AND TRADEMARK OFFICE
CERTIFICATE OF CORRECTION

PATENT NO. : 7,203,775 B2
APPLICATION NO. : 10/337833
DATED : April 10, 2007
INVENTOR(S) : Stephen R. Van Doren et al.

It is certified that error appears in the above-identified patent and that said Letters Patent is hereby corrected as shown below:

In column 13, line 65, in Claim 1, delete "mare" and insert -- more --, therefor.

In column 14, line 4, in Claim 1, delete "mare" and insert -- more --, therefor.

In column 14, line 57, in Claim 12, delete "to" and insert -- the --, therefor.

In column 15, line 6, in Claim 14, before "the" insert -- in --.

In column 15, line 14, in Claim 14, after "buffer" insert -- , --.

Signed and Sealed this

Second Day of September, 2008

JON W. DUDAS
*Director of the United States Patent and Trademark Office*